3,822,265
PHENAZINE DERIVATIVES
Willy Leimgruber, Montclair, and Manfred Weigele, North Caldwell, N.J., assignors to Hoffmann-La Roche Inc., Nutley, N.J.
No Drawing. Continuation-in-part of abandoned application Ser. No. 596,794, Nov. 25, 1966. This application May 14, 1969, Ser. No. 824,695
Int. Cl. C07d 51/80
U.S. Cl. 260—267
7 Claims

ABSTRACT OF THE DISCLOSURE

N-mono- and N,N'-dioxides of dialkoxyphenazines are prepared by oxidation of the appropriate dialkoxyphenazines. The corresponding mono- and di-hydroxyalkoxyphenazines are prepared by selective ether cleavage of the dialkoxy compounds or by selective mono- or di-alkylation of the dihydroxy or protected mono-hydroxy compounds. The phenazine N,N'-dioxides possess useful antimicrobial properties.

RELATED APPLICATIONS

This application is a continuation-in-part of U.S. Patent Application Ser. No. 596,794, filed Nov. 25, 1966, now abandoned, the benefit of the date of which is hereby claimed.

DETAILED DESCRIPTION OF THE INVENTION

This invention relates to novel processes for the synthesis of antimicrobial phenazine N,N'-dioxides and to novel intermediates useful in the syntheses thereof. 1,6-Phenazinediol-5,10-dioxide (iodinin) is a known compound having broad spectrum antibacterial properties (Gerber and Lechevalier, Biochemistry, Volume 4, page 176, 1965). Iodinin was first isolated from Chromobacterium iodinium. The compound has been subsequently synthesized by oxidation of 1,6-dihydroxyphenazine obtained by de-ethylation of 1,6-diethoxyphenazine prepared by the Wohl-Aue reaction (Chem. Abstracts, Volume 45, page 4249, 1951 and the Journal of the Pharmaceutical Society of Japan, Volume 72, page 1301, 1952). Applicants have now discovered that iodinin as well antimicrobial analogs thereof can be prepared from a 1,6-dialkoxyphenazine or from 1,6-dibenyloxyphenazine according to the following scheme.

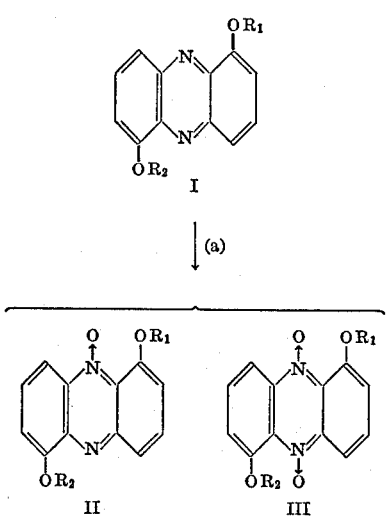

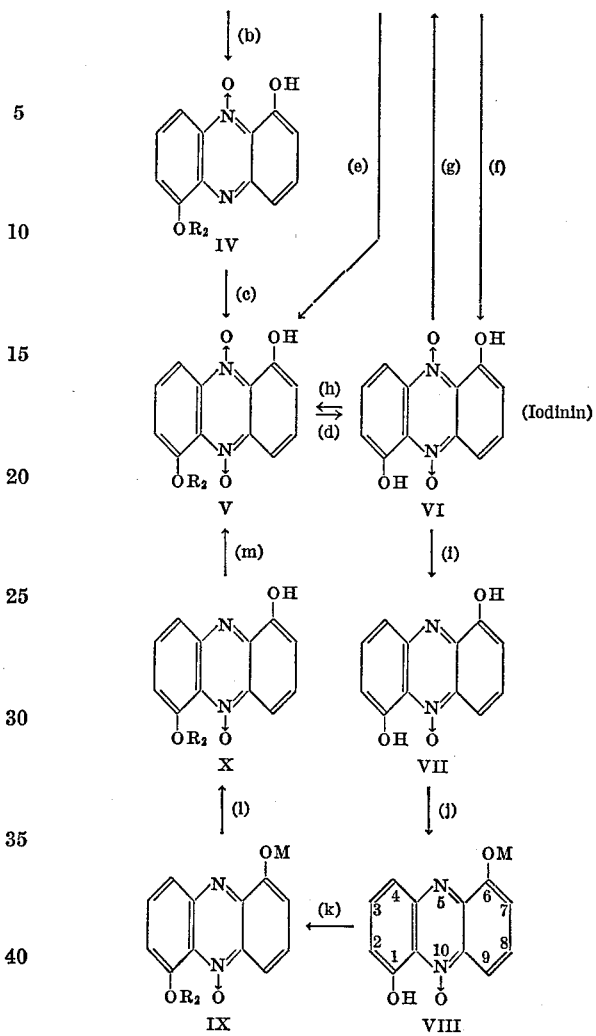

wherein $R_1$ and $R_2$ in each of the above formulas is independently selected from the group consisting of lower alkyl and benzyl and M is a base stable, acid labile protecting group.

As used herein the term "lower alkyl" denotes a straight chain hydrocarbon containing 1 to 7 carbon atoms, e.g., methyl, ethyl, propyl, n-propyl, n-butyl and the like. Especially preferred are the straight chain alkyls containing 1 to 3 carbon atoms, i.e., methyl, ethyl and propyl.

As used herein "base stable, acid labile protecting group" denotes those groups which are sufficiently stable to bases to enable selective alkylation of the hydroxy group and are sufficiently acid labile to permit their removal by acids without dealkylating the alkylated hydroxy group. Exemplary are the methoxy-methyl and benzyl groups. Typical suitable reagents which will provide these protecting groups are halomethyl-lower alkyl ethers and benzyl halides, with the halogen preferably chlorine or bromine.

According to one process aspect of this invention, iodinin is prepared by oxidation of a 1,6-di-substituted-phenazine derivative of formula I with a hydroperoxide whereby there is obtained a mixture of a N-mono-oxide of formula II and a N,N'-dioxide of formula III. The mixture can be readily separated by fractional crystallization or chromatography. Hydroperoxides which can be suitably employed in carrying out this oxidation are hydrogen peroxide or the peroxy acids particularly the organic peroxy acids such as the lower alkanoic peroxy acids, e.g., peracetic acid, trifluoro-peracetic acid, perpropionic acid, etc., or the perbenzoic acids, e.g., perbenzoic acid, m-chloro-perbenzoic acid, etc. The oxidation with hydroperoxide is conveniently carried out in the presence of an inert organic solvent such as hydrocarbon solvent, e.g., benzene, toluene and the like. When hydrogen peroxide is used, the preferred solvent is acetic acid or solvent mixtures with acetic acid. The reaction is readily accomplished at room temperature proceeding to a steady state in about 15 to 20 hours. Higher or lower temperatures can also be utilized with correspondingly shorter or longer reaction times. The phenazine starting materials of formula I are known compounds or analogs of known compounds which are readily obtainable via the Wohl-Aue synthesis. The starting materials employed in the novel processes of this invention include both the symmetric compounds such as 1,6-dimethoxyphenazine, 1,6-diethoxyphenazine, 1,6-di-n-propyl-oxyphenazine, 1,6-dibenzyloxyphenazine and the unsymmetric compounds such as 1-methoxy-6-ethoxyphenazine, 1 - methoxy-6-n-propyloxyphenazine, 1 - ethoxy - 6-n-propyloxyphenazine, 1-benzyloxy - 6 - methoxyphenazine, 1 - benzyloxy - 6-ethoxyphenazine, 1-benzyloxy-6-n-propyloxyphenazine.

The N,N'-dioxides of formula III which are obtained as described above can be converted directly to iodinin by cleavage of both ether groups. The ether groups are readily cleaved by treating with a halide of a Group III element, particularly the bromides and the chlorides such as, for example, boron trichloride, aluminum bromide, aluminum chloride and the like. The ether cleavage is suitably carried out by the addition of a halide of a Group III element in an inert organic solvent such as, for example, hydrocarbon solvents, e.g., benzene, or others, e.g., diethyl ether, tetrahydrofuran, dioxane and the like, to a solution of the N,N'-dioxide of formula III in a non-polar solvent such as benzene, chloroform and the like and allowing the reaction to proceed at room temperature for a period of a few hours. The reaction can also be carried out at higher or lower temperatures with correspondingly longer or shorter reaction times.

Alternatively, the N,N'-dioxides of formula III can be converted to iodinin via the 1 hydroxy-6-$OR_2$-5,10-dioxide intermediate of formula V by successively cleaving the ether groups in the 1- and 6-positions, respectively. The partial dealkylation and debenzylation of compounds of formula III is conveniently accomplished by treating the formula III intermediates with one of the less active halides of the Group III elements or, alternatively, by carrying out the reaction under milder conditions, e.g., lower temperatures. Generally, the chlorides of the Group III elements are considerably less active in bringing about ether cleavage than are the corresponding bromides and, accordingly, the partial ether cleavage is preferably carried out by utilizing a chloride of a Group III element, for example, aluminum chloride. The reaction is conveniently carried out by adding a solution of a halide of a Group III element, e.g., aluminum chloride, in an inert organic solvent such as ether, tetrahydrofuran, dioxane and the like to a solution of the formula III intermediate in a non-polar solvent such as a hydrocarbon solvent, for example, benzene, chloroform and the like and allowing the reaction to proceed at room temperature. The reaction is ordinarily completed within several hours at room temperature. Higher or lower temperatures can also be utilized with a consequent increase or decrease in reaction time.

In still another alternative process iodinin can be prepared via the mono-N-oxide of formula II obtained as a by-product in the oxidation of the 1,6-di-substituted-phenazines of formula I as shown by the reaction sequence (b), (c), (d) in the schematic diagram above. Cleavage of the ether group in the 1-position of the mono-N-oxide of formula II is readily effected by the addition of a solution of a halide of a Group III element, e.g., aluminum bromide, aluminum chloride and the like, in the presence of an inert organic solvent such as benzene, ether, etc., to a solution of a compound of formula II in a non-polar solvent such as benzene, chloroform and the like and allowing the reaction to proceed at room temperature for a period of 1 to 2 hours. Higher or lower temperatures can also be employed with corresponding changes in reaction time.

The mono-N-oxide of formula IV is converted to the corresponding N,N'-dioxide of formula V by oxidation with a hydroperoxide in analogy to the process described hereinabove for the oxidation of phenazine derivatives of formula I. The intermediates of formula V are readily converted to iodinin by a further cleavage of the ether group as described hereinabove. As a practical matter, the reactions designated as (b) and (e), respectively, in the schematic diagram above are limited to symmetric compounds in order to avoid separation of the mixtures obtained on partial cleavage of an unsymmetric compound. The novel processes described above provide particularly facile preparative routes to the intermediates of formula V and to iodinin by virtue of the discovery that the N-oxide group accelerates the ether cleavage through anchimeric assistance.

The intermediates of formulas II, III, IV and V are, as noted above, useful intermediates in the synthesis of the known antimicrobial, iodinin. In addition, certain of these components have also exhibited potent broad spectrum antimicrobial activity and, accordingly, this invention in one of its aspects also relates to the preparation of certain novel antimicrobial compounds. Compounds of formulas III and V have been found to be particularly active against a wide variety of Gram-positive and Gram-negative bacteria, yeast, mold, fungi, mycobacterium, etc. They are active, for example, against *B. subtilis, E. coli, M. phlei, S. aureus, Ps. aeruginosa, S. cerevisiae, P. varioti* and *C. albicans*. Accordingly, these compounds are useful as germicides. More particularly, they are useful as internal germicides in the treatment of infectious diseases.

The products of the invention can be incorporated into standard pharmaceutical dosage forms, for example, they are useful for oral or parenteral application with the usual pharmaceutical adjuvant materials, e.g., organic or inorganic inert carrier materials such as water, gelatin, lactose, starch, magnesium stearate, talc, vegetable oils, gums, polyalkylene glycols, Vaseline, etc. The pharmaceutical preparations can be employed in a solid form, e.g., as tablets, troches, suppositories, capsules, or in liquid form, e.g., as solutions, suspensions or emulsions. The pharmaceutical adjuvant material can include preservatives, stabilizers, wetting or emulsifying agents, salts to change the osmotic pressure or to act as buffers. They can also contain other therapeutically active materials.

In still aonther of its process aspects this invention relates to the synthesis of the antimicrobial compounds of formulas III and V starting from the known compound 1,6-phenazinediol-5,10-dioxide (iodinin) which has been, as noted above, previously prepared by microbiological methods and by synthetic routes other than those disclosed herein. The novel compounds of formula III wherein $R_1$ and $R_2$ are the same can be obtained directly from iodinin by alkylation or by benzylation. The alkylation or benzylation of iodinin is carried out by treating iodinin with an alkylating or benzylating agent such as dialkylsulfate, benzyl halide and the like. The reaction is preferably carried out in the presence of an aqueous alkali. This reaction is preferably carried out by first converting iodinin to its alkali metal salt, e.g., the sodium or the potassium salts being preferred. The salt is subsequently alkylated or benzylated with conventional alkylating agents. In the event it is desired to have a predominance of compound of formula V produced, less aqueous alkali and less alkylating agent is used, thus reducing the chances of both hydroxy groups reacting. The reaction product is obtained as a mixture of a compound of formula III wherein $R_1$ and $R_2$ are the same and the corresponding compound of formula V. Separation of the products can be readily accomplished by the usual techniques such as fractional crystallization, chromatography, etc. The so-obtained compounds of formula III can, if desired, be converted to compounds of formula V by partial dealkylation or debenzylation whereby only one of the ether groups in positions 1 and 6 is cleaved. The partial cleavage is accomplished by treating the compound with a chloride of a Group III element as described hereinabove.

In yet another of its process aspects this invention relates to the direct synthesis of the antimicrobial compounds of formula V to the virtual exclusion of compounds of formula III starting from the known compound, 1,6-phenazinediol-5,10-dioxide (iodinin). This is accomplished by reducing iodinin or an alkali metal salt of iodinin to the mono-oxide of formula VII. This can conveniently be accomplished with about one equivalent of a conventional reducing agent, e.g., $SnCl_2$ in sodium hydroxide. Compound VII is then converted to compound VIII by protecting the 6-hydroxy group with a base stable, acid labile group forming novel compounds of formula VIII. For convenience the ring positions of the phenazine nucleus are numbered on compound VIII in the reaction scheme. This numbering is utilized throughout the specification and claims. This is accomplished by first forming the mono alkali metal salt of compound VII. This salt forms on the more acidic 6-OH group. The protecting group, e.g., benzyl or methoxy-methyl, is then substituted for the alkali metal by reacting the salt at room temperature for several hours, e.g., about 1 to 6 hours, with an alkoxymethyl halide, e.g., chloromethyl-methyl ether or a benzyl chloride. The remaining 1-OH group of compounds of formula VIII is then selectively alkylated in the conventional manner as mentioned previously to form novel intermediates of formula IX. The protecting group is then removed from the compounds of formula IX to form the compounds of formula X. This is accomplished by treatment in weakly acidic medium, e.g., dilute aqueous HCl. Compounds of formula V are then formed by oxidizing compounds of formula X with a hydroperoxide as described previously.

This invention will be understood better by reference to the following examples which are given for illustration purposes only and are not meant to limit the invention. Temperatures are in degrees Centigrade.

EXAMPLE 1

The solvent of a 5 percent chloroform solution of perbenzoic acid (120 ml.) was replaced by benzene by repeated addition of benzene and partial evaporation in a Rotavapor. The final benzene solution was about 200 ml. To this solution in a 1 l. round bottom flask was added 2.4 g. 1,6-dimethoxyphenazine and the mixture stirred at room temperature for about 15 hours. The color of the solution changed from yellow to reddish-orange. The solution was extracted twice with 100 ml. 5 percent aqueous $Na_2CO_3$. The benzene layer was washed with 100 ml. $H_2O$. The combined aqueous extract was re-extracted with 2× 100 ml. $CHCl_3$ and 2× 50 ml. $CHCl_3$. The combined $CHCl_3$ extracts were washed with 100 ml. $H_2O$. The combined benzene and $CHCl_3$ extracts were dried over $Na_2SO_4$ and concentrated to dryness on a Rotavapor. The residue was dissolved in about 50 ml. $CHCl_3$ and chromatographed on Florisil to yield 1,6-dimethoxyphenazine-5-oxide, m.p. 192° dec. and 1,6-dimethoxyphenazine-5,10-dioxide, m.p. 190–191° dec.

By analogous procedure there are also prepared the following:

1,6-diethoxyphenazine-5,10-dioxide
1,6-dipropyloxyphenazine-5,10-dioxide
1,6-dibenzyloxyphenazine-5,10-dioxide
1,6-diethoxyphenazine-5-oxide
1,6-dipropyloxyphenazine-5-oxide
1,6-dibenzyloxyphenazine-5-oxide.

EXAMPLE 2

To a suspension of 4.5 g. 1,6-dimethoxyphenazine in 500 ml. of benzene was added a solution of 20 g. m-chloroperbenzoic acid in 500 ml. of benzene. The reaction mixture was stirred at room temperature for 15 hours, and the red solution so obtained was washed twice using 100 ml. of 10 percent sodium carbonate each time. The aqueous phase was re-extracted with 3× 100 ml. of chloroform. The chloroform extracts were combined with the benzene extracts, washed once with water, dried over sodium sulfate and evaporated on a Rotavapor. The residue was redissolved in chloroform and chromatographed on Florisil from which there was obtained one fraction of pure 1,6-dimethoxyphenazine-5-oxide, m.p. 192° dec.; and a second fraction containing pure 1,6-dimethoxyphenazine-5,10-dioxide, m.p. 190–191° dec.

EXAMPLE 3

150 mg. of 1,6-dimethoxyphenazine-5-oxide was dissolved in 3 ml. of benzene and 3 ml. of chloroform. A solution of 200 mg. of aluminum bromide in 3 ml. of benzene was added dropwise. The mixture was stirred at room temperature for 20 minutes and then poured on ice. The organic layer was separated, the aqueous phase was diluted with more water and extracted several times with chloroform. The combined organic layers were dried over $Na_2SO_4$ and evaporated in vacuo (ca. 25 mm.). The residue was redissolved in chloroform and filtered through a silica gel column. The filtered solution was evaporated, redissolved in chloroform and chromatographed on acid alumina (activity 2). After elution of the remaining starting material, the column material was slurried in chloroform. After deactivation by the addition of a little water, the 1-hydroxy-6-methoxyphenazine-10-oxide dissolved in the chloroform. The extraction of the column material with chloroform was repeated twice. The combined solutions were dried over sodium sulfate and evaporated. Pure 1-hydroxy-6-methoxyphenazine-10-oxide, m.p. 220–225° dec. remained.

By analogous procedure there are also prepared the following:

1-hydroxy-6-ethoxyphenazine-10-oxide
1-hydroxy-6-propyloxyphenazine-10-oxide
1-hydroxy-6-benzyloxyphenazine-10-oxide.

EXAMPLE 4

To a solution of 50 mg. 1,6-dimethoxyphenazine-5,10-dioxide in 5 ml. chloroform there was added a solution of 25 mg. aluminum chloride in 7 ml. of ether. The mixture was stirred at room temperature for 14 hours. The reaction mixture was then diluted with 30 ml. chloroform and washed with 40 ml. water. The layers were separated and the aqueous phase was extracted with 5× 30 ml. chloroform. The organic layers were combined, washed with a little water, dried over sodium sulfate and evaporated to dryness. The residue was redissolved in chloroform and chromatographed on acid alumina. After the remaining starting material had been eluted with chloroform, the column filling was pushed out, deactivated by the addition of a little water and extracted with 6× 30 ml. chloroform. The resulting red solution was evaporated to dryness. The residue obtained in this way was pure 1-hydroxy-6-methoxyphenazine-5,10-dioxide, m.p. 125–135° dec.

EXAMPLE 5

To a solution of 272 mg. 1,6-dimethoxyphenazine-5,10-dioxide in 25 ml. chloroform there was added a solution of 133 mg. aluminum chloride in 7 ml. of ether. The reaction mixture was stirred at room temperature for 15 hours. The reaction mixture was diluted with 100 ml. of chloroform and washed with 150 ml. of water. The water layer was extracted with 1× 100 ml. and 8× 50 ml. chloroform. The combined organic phases were washed with 100 ml. of water, dried over sodium sulfate and evaporated to dryness. The resulting mixture was separated by chromatography on acid alumina. After elution of the starting material, the column was pushed out, slurried in 100 ml. of chloroform and deactivated by the addition of 5 ml. of water. The chloroform was decanted and the alumina washed with 6× 75 ml. portions of chloroform. The combined organic solutions were evaporated to dryness yielding 1-hydroxy-6-methoxyphenazine-5,10-dioxide, m.p. 125–135° dec.

EXAMPLE 6

To a suspension of 242 mg. 1-methoxy-6-hydroxyphenazine-5-oxide in 10 ml. benzene was added a solution of 500 mg. m-chloroperbenzoic acid in 10 ml. benzene. This was stirred at room temperature for 24 hours. The reaction mixture was filtered and without further workup chromatographed on acid alumina. The fractions containing the pure product 1-methoxy-6-hydroxyphenazine-5,10-dioxide were combined, evaporated and crystallized from acetone to yield 1-methoxy-6-hydroxyphenazine-5,10-dioxide, m.p. 125–135° dec.

EXAMPLE 7

To a suspension of 10 g. 1-methoxy-6-ethoxyphenazine in 500 ml. benzene was added a slurry of 40 g. m-chloroperbenzoic acid in 300 ml. benzene. This was stirred at room temperature for 16 hours and the reaction mixture was filtered from precipitated m-chloroperbenzoic acid. The filtrate was washed with 2× 150 mg. of 5 percent sodium carbonate. The aqueous phases were re-extracted with 2× 100 ml. chloroform. The combined organic layers were dried over sodium sulfate and evaporated on a Rotavapor. The residue was dissolved in chloroform and was chromatographed on Florisil yielding 1-methoxy-6-ethoxyphenazine-5,10-dioxide, m.p. 155–156° dec., 1-methoxy-6-ethoxyphenazine-5-oxide and 1-methoxy-6-ethoxyphenazine-10-oxide.

By analogous procedure, there are also prepared the following:

1-methoxy-6-propyloxyphenazine-5,10-dioxide
1-methoxy-6-benzyloxyphenazine-5,10-dioxide
1-ethoxy-6-propyloxyphenazine-5,10-dioxide
1-ethoxy-6-benzyloxyphenazine-5,10-dioxide (as well as the corresponding 5-oxides and 10-oxides).

EXAMPLE 8

Iodinin (50 mg.) was dissolved in 50 ml. of chloroform. The iodinin was extracted from this solution into 20 ml. of 15 percent sodium hydroxide. The alkaline solution was separated and 5 ml. dimethyl sulfate were added to it. The reaction mixture was heated gently (40–45°) for 20 minutes with vigorous agitation. After acidification, the mixture was extracted with 4× 50 ml. chloroform. The chloroform extract was dried over sodium sulfate and evaporated in vacuo. The solid residue consisted of a mixture of mainly 1-hydroxy-6-methoxyphenazine-5,10-dioxide and a little 1,6-dimethoxyphenazine-5,10-dioxide. The components were obtained in pure form by chromatography on alumina.

EXAMPLE 9

To a solution of 160 mg. 1,6-dimethoxyphenazine-5,10-dioxide in 3 ml. chloroform and 2 ml. benzene was added a solution of 200 mg. aluminum bromide in 3 ml. benzene. The mixture was stirred for 1½ hours at room temperature and then poured on ice-water. The organic layer was diluted with chloroform and separated. The aqueous layer was extracted with 5× 40 ml. of chloroform. The combined organic layers were washed once with water, dried over sodium sulfate and evaporated in vacuo (ca. 25 mm. Hg). The resulting residue was redissolved in chloroform and chromatographed on a silica gel column. A fraction was obtained, which after evaporation yielded 1,6-phenazinediol-5,10-dioxide iodinin, identical with an authentic sample.

EXAMPLE 10

Into a 1000 ml. round bottom flask was placed 2.44 grams of iodinin, 150 ml. hexamethyl phosphoric triamide (HMPT), 1.3 grams potassium t-butoxide. The reaction mixture was stirred at room temperature overnight. To the resulting solution, 2.5 grams SnCl$_2$ in 100 ml. 5 percent aqueous NaOH was added. The mixture dissolved on addition of another 100 ml. of water. The solution was kept at room temperature for 45 minutes. Then the reaction product was precipitated with 50 ml. of 10 percent HCl and ice. The precipitate was filtered, dissolved in chloroform. The solution was concentrated in vacuum to yield crystalline 1,6-dihydroxyphenazine-10-oxide, m.p. 240° dec.

EXAMPLE 11

114 mg. 1,6-dihydroxyphenazine-10-oxide, 3 ml. HMPT and 60 mg. potassium t-butoxide were put into a 10 ml. round bottom flask and stirred at room temperature for 2¾ hours. Then 0.1 ml. chloromethyl methyl ether was added and the reaction mixture was then stirred at room temperature for 1½ hours. The reaction mixture was then diluted with water and extracted with ethyl acetate. The extracts were washed with water, dried over magnesium sulfate and concentrated, washed with diethyl ether and filtered to yield 6-methoxymethoxy-1-hydroxyphenazine-10-oxide. The product was used in the next reaction step without further purification.

EXAMPLE 12

110 mg. 6-methoxymethoxy-1-hydroxyphenazine-10-oxide, 3 ml. HMPT and 60 mg. potassium t-butoxide were placed in a 10 ml. round bottom flask and stirred at room temperature for 2¼ hours. Then 0.1 ml. dimethyl sulfate was added and the reaction mixture was stirred at room temperature for 1½ hours. The reaction mixture was diluted with water and extracted with ethyl acetate. The extracts were washed with water, dried over magnesium sulfate and concentrated. The residue was slurried with diethyl ether and filtered and recrystallized from acetone to yield 1-methoxy-6-methoxymethoxy-phenazine-10-oxide, m.p. 154–157° (dec.).

EXAMPLE 13

150 mg. 1-methoxy-6-methoxymethoxy-phenazine-10-oxide were dissolved in 1 ml. dimethyl sulfoxide and 1.0 ml. 10 percent aqueous hydrochloric acid. The solution was stirred overnight at room temperature. The reaction mixture was diluted with water and the acid was neutralized with 5 percent aqueous NaHCO$_3$. The resulting mixture was extracted with chloroform and the extracts were re-extracted with 10 percent aqueous NaOH. The basic extracts were made acidic with 10 percent aqueous hydrochloric acid and extracted with chloroform. The chloroform extracts were washed with water, dried over magnesium sulfate and concentrated. The orange residue which resulted was recrystallized from acetone to yield 6-methoxy-1-hydroxyphenazine-5-oxide, m.p. 166–168° dec.

EXAMPLE 14

4 mg. 6-methoxy-1-hydroxyphenazine-5-oxide, 1 ml. chloroform and 10 mg. m-chloroperbenzoic acid were placed in a 5 ml. round bottom flask. The reaction mixture was allowed to stand at room temperature, shielded from light, overnight. The product was recovered by thin layer chromatography and proved to be identical to 6-methoxy-1-hydroxyphenazine-5,10-dioxide.

What is claimed is:

1. 1-hydroxy-6-benzyloxyphenazine-5,10-dioxide.

2. A compound of the formula

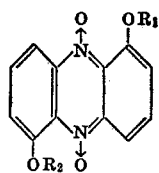

wherein $R_1$ and $R_2$ are each benzyl, i.e., the compound 1,6-dibenzyloxyphenazine 5,10-dioxide.

3. A compound of the formula

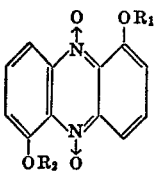

wherein $R_1$ is methyl and $R_2$ is benzyl, i.e., the compound 1-methoxy-6-benzyloxy-phenazine-5,10-dioxide.

4. A compound of the formula

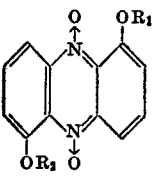

wherein $R_1$ is ethyl and $R_2$ is benzyl, i.e., the compound 1-ethoxy-6-benzyloxy-phenazine-5,10-dioxide.

5. A compound of the formula

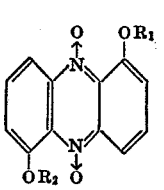

wherein $R_1$ is propyl and $R_2$ is benzyl, i.e., the compound 1-propyloxy-6-benzyloxy-phenazine-5,10-dioxide.

6. A compound of the formula

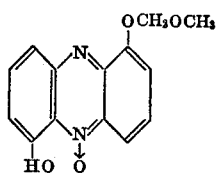

7. A compound of the formula

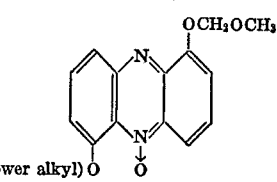

References Cited

UNITED STATES PATENTS

| | | | |
|---|---|---|---|
| 3,609,153 | 9/1971 | Cook et al. | 260—267 |
| 3,432,505 | 3/1969 | Rosenbrook et al. | 260—267 |
| 2,500,131 | 3/1950 | Linsker | 260—279 |
| 2,518,130 | 8/1950 | Evans et al. | 260—250 |

FOREIGN PATENTS

| | | | |
|---|---|---|---|
| 1,451,606 | 9/1965 | France | 260—267 |

OTHER REFERENCES

Edwards, et al.: Tetrahedron Letters No. 40, pp. 4867–70, October 1966.

Chernetskiĭ, V. P. et al.: Chem. Abstracts, 47, 6953c (1953).

Elderfield: *Heterocyclic Compounds*, Wiley & Sons, Inc., New York, 1957 (pp. 683–684 relied on).

Culvenor: *Reviews Pure and Applied Chemistry*, vol. 3, p. 86 (1953).

DONALD G. DAUS, Primary Examiner

A. M. T. TIGHE, Assistant Examiner

U.S. Cl. X.R.

424—250